Patented May 14, 1946

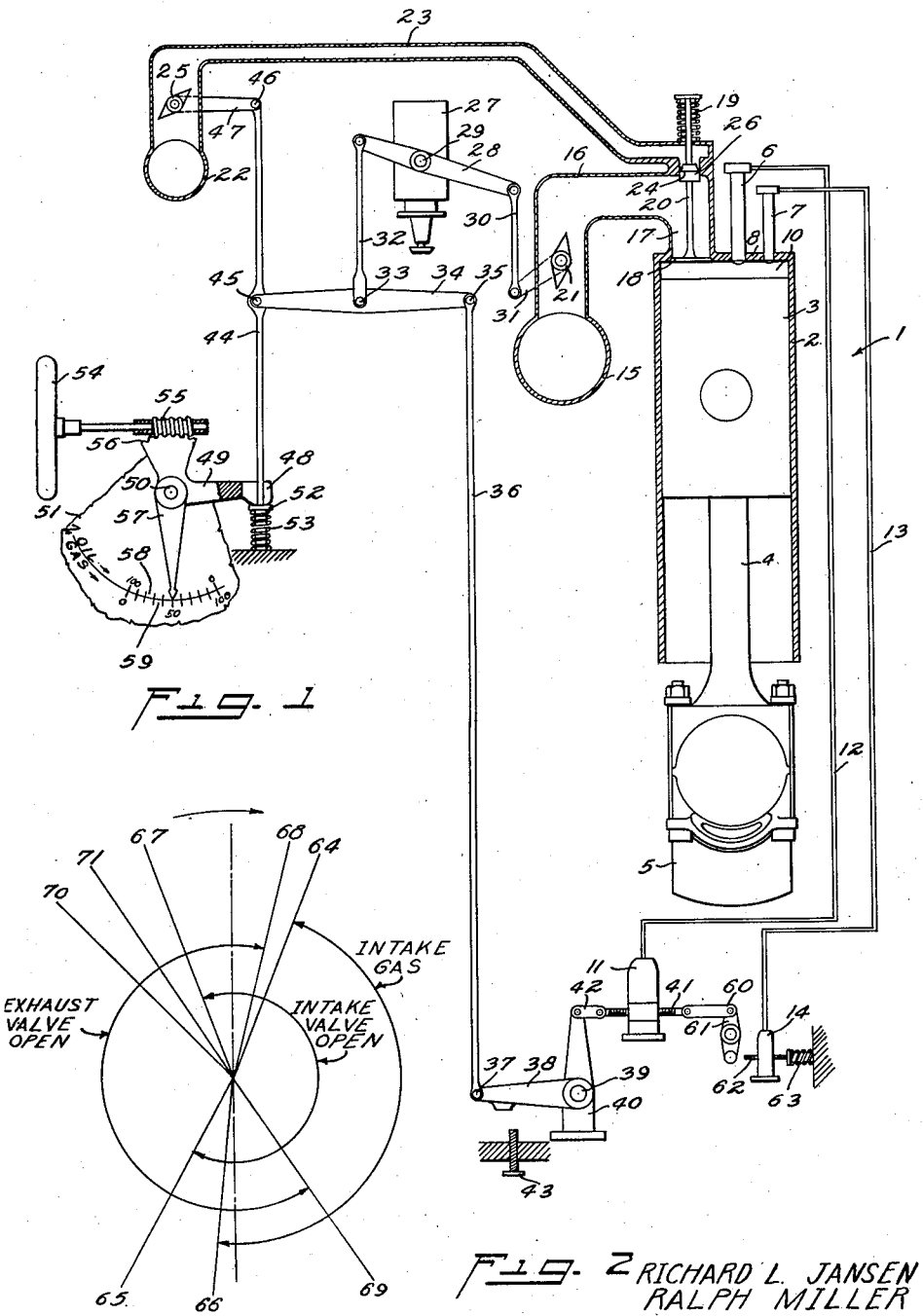

2,400,247

UNITED STATES PATENT OFFICE 2,400,247

INTERNAL-COMBUSTION ENGINE

Ralph Miller and Richard L. Jansen, Buffalo, N. Y., assignors to Worthington Pump and Machinery Corporation, Harrison, N. J., a corporation of Delaware Application March 14, 1945, Serial No. 582,618

17 Claims. (Cl. 123—127)

This invention relates to internal combustion engines, and more particularly to a dual fuel engine which will operate on either Diesel fuel or gas or any combination of the two.

Diesel engines are normally operated with liquid petroleum fuel having viscosity and ignition characteristics desirable for this type of engine. Some liquids and gases have very high autogenous ignition temperatures and cannot, therefore, be used in the standard Diesel engine with 400 to 500 pounds compression pressure unless some means of initiating the combustion are employed. Ignition of these fuels may be accomplished by an electric spark system or by timed injection of a small quantity of Diesel fuel at the proper crank angle.

In the Diesel engine the atomized liquid fuel burns in the combustion chamber even though the total air present is far in excess of that required. When gaseous fuels are used and admitted into the combustion chamber completely mixed with air, the mixture will be very lean and the combustion slow and incomplete, if the quantities of gas are small and mixed with a full charge of air. This is so even when ignition is effected by the flame of injected Diesel pilot fuel. To prevent this when operating with gaseous fuels in a Diesel engine, the quantity of air taken into the cylinder on the suction stroke must be controlled to maintain a suitable air-fuel ratio at all loads.

Accordingly, an object of the present invention is to provide an internal combustion engine which will operate on either Diesel fuel or gas or any combination of the two, wherein novel means are embodied for regulating the relative quantities of Diesel fuel and gas delivered to the engine, and in which means are provided for maintaining a suitable air-fuel ratio at all loads.

Another object is to provide an internal combustion engine which will operate on either Diesel fuel or gas or any combination of the two, in which means are provided for regulating the delivery of Diesel fuel and gas to the engine in predetermined relative quantities, and in which means are embodied for maintaining a pilot injection of Diesel fuel regardless of the quantity of gas delivered to the engine.

A further object is to provide an internal combustion engine which will operate on either Diesel fuel or gas or any combination of the two, and in which means are provided for maintaining a pilot injection of Diesel fuel regardless of the quantity of gas delivered to the engine, and for advancing the pilot injection when the engine is operating on all gas or a combination fuel in which gas predominates in the mixture to compensate for the slower burning characteristics of such fuel.

With these and other objects in view, as may appear from the accompanying specification, the invention consists of various features of construction and combination of parts, which will be first described in connection with the accompanying drawing, showing an internal combustion engine of a preferred form embodying the invention, and the features forming the invention will be specifically pointed out in the claims.

In the drawing:

Figure 1 is a diagrammatic and partial sectional view of an internal combustion engine in accordance with the present invention.

Figure 2 illustrates a valve and pump timing diagram.

Referring more particularly to the drawing, Figure 1 illustrates an internal combustion engine 1 wherein the cylinder 2 thereof contains the usual piston 3, the latter being actuated by a connecting rod 4 driving a crankshaft 5. A main fuel injection nozzle 6 and a pilot fuel injection nozzle 7 are incorporated in the head 8 of the cylinder 2, both nozzles having communication with the combustion chamber 10 in the cylinder 2. By using a pilot fuel injection nozzle 7 with small orifices, the pilot or ignition fuel quantity may be adjusted to be as low as 5% of the total fuel (on the basis of B. t. u.) required for engine operation. While the percentage of oil or Diesel fuel used can be increased to any desired value up to 100%, the small area pilot fuel injection nozzle 7 has a maximum injection capacity limited to about 15 to 20% of the total fuel used, so that larger quantities beyond this must be injected with the standard Diesel engine nozzle 6, as when the engine is operated on a high percentage of Diesel fuel.

A main fuel injection pump 11 supplies fuel to the nozzle 6 through a fuel line 12, and pilot fuel is supplied to the nozzle 7 through a line 13 which connects with a pilot fuel injection pump 14. Both pumps 11 and 14 may be actuated by the usual cam operating mechanism (not shown). Air is supplied to the combustion chamber 10 from a manifold 15, the latter communicating with a conduit 16 opening into an inlet port 17 in the head 8. Communication between the inlet port 17 and the combustion chamber 10 is controlled by an inlet valve 18, this valve being yieldingly biased to a closed position by a spring 19 mounted on the stem 20 attached to the valve.

The head 8 will, of course, be provided with the usual exhaust valve (not shown), and both the inlet valve and the exhaust valve will be operated by cams and levers (not shown) in the usual manner employed in internal combustion engines. An air control valve 21 in the conduit 16 regulates the quantity of air admitted to the combustion chamber 10.

Gas fuel is supplied to the combustion chamber 10 from a manifold 22, this manifold communicating with a conduit 23 opening into the inlet port 17 through a valve port 24. A valve 25 in the conduit 23 regulates the quantity of gas admitted to this conduit, and a piston valve 26 which operates in the valve port 24 closes the conduit 16 from the conduit 23, but regulates the flow of gas from the conduit 23 into the port 17. The piston valve 26 is fixed to the valve stem 20 so as to operate in proper timed relationship with the inlet valve 18.

A governor 27, of any approved type and which is driven from the engine 1 in any suitable manner, is operatively connected with the injection pump 11, the air valve 21, and the gas valve 25 for regulating the quantities of gas, air, and Diesel fuel in the proper proportions and in the proper total quantity required by the load carried by the engine. The operating connections for this purpose comprise a governor lever 28 which is attached to the governor shaft 29, the latter being rotated clockwise in response to an increased load on the engine and counterclockwise upon reduction in engine load, as when viewing Figure 1.

To one end of the lever 28 is pivoted one end of a link 30, the other end of the link being pivotally connected with an arm 31 attached to the rotative air valve 21 for adjusting this valve in accordance with engine load demands. To the opposite end of the lever 28 is pivotally connected one end of a link 32, the other end of the link being pivotally connected at 33 with a floating lever 34, which pivotal connection is located intermediate the ends of the floating lever.

One end of the floating lever 34 is pivotally connected at 35 with one end of a link 36 having its other end pivotally connected at 37 with one end of a bell crank 38. This bell crank is pivotally mounted at 39 upon a support 40, and the other end of the bell crank is operatively connected with the control rack 41 of the injection pump 11, as by a link 42 which is pivotally connected with both the bell crank and the control rack. Actuation of the link 36 through movement of the floating lever 34 imparts pivotal movement to the bell crank 38 for adjusting the control rack 41 and regulating the quantity of Diesel fuel delivered by the pump 11. When viewing Figure 1, clockwise rotation of the bell crank 38 increases the fuel quantity delivered by the pump 11, while counterclockwise movement of the bell crank reduces the quantity of fuel delivered by this pump. The minimum quantity of fuel delivered per injection may be regulated by a stop screw 43 which is located to be engaged by the bell crank 38 in its extreme counterclockwise position.

A link 44 is pivotally connected intermediate its ends at 45 with the end of the floating lever 34 opposite the pivotal connection 35. One end of the link 44 is pivotally connected at 46 with an arm 47 attached to the rotative valve 25 to regulate the quantity of gas which may pass this valve. The opposite end of the link 44 passes through a fork 48 at one end of a bell crank 49, the latter being pivotally mounted at 50 on a suitable support 51. A collar 52 is attached to the link 44 to engage underneath the fork 48, which collar is urged against the fork 48 by a compression spring 53, so that the link 44 is maintained in operative connection with the bell crank 49. Although the spring 53 holds the collar 52 firmly against the fork 48, the bell crank 49 may be rotated in either direction about its pivot 50 to adjust the gas valve 25 and thereby control the quantity of gas to be delivered to the engine.

Since the link 36 is connected with one end of the floating lever 34 and the link 44 is connected with the other end of the lever, with the lever pivotally supported intermediate the pivotal connections 35 and 45, any movement of the link 44 for adjusting the gas valve 25 is also transmitted to the link 36 through the floating lever 34 for adjusting the pump 11 to deliver a complementary quantity of Diesel fuel to the engine.

Means for adjusting the bell crank 46 comprise a hand wheel 54 which is attached to a worm 55, this worm meshing with a segment of a worm gear 56 formed at the end of the bell crank 49 opposite the fork 48. To the bell crank 49 is fixedly related a pointer 57 for coaction with a Diesel fuel scale 58 and a gas scale 59. The scales 58 and 59 are each suitably graduated from 0 to 100, but with the scale 58 reading from right to left and the scale 59 reading from left to right, so that a pointer reading of 0 on one scale will give a reading of 100 on the other scale.

In Figure 1, the governor lever 28 is shown in full load position, the air valve 21 being open or slightly throttled. The bell crank 49 is set for 50% Diesel fuel and 50% gas, as indicated by the pointer 57. The force exerted by the spring 53 is greater than the force required to move the control rack 41 through the bell crank 38. If at this time the load on the engine is reduced, the governor lever 28 turns counterclockwise to reduce the fuel quantity. Due to the action of the spring 53, the pivotal connection 45 remains fixed as to position and the pivotal connection 35 moves the link 36 downward to reduce the fuel quantity delivered by the pump 11.

As the load on the engine is progressively reduced, the bell crank 38 will finally stop against the stop screw 43. Reduction of the engine load beyond this point will cause the governor to move the pivotal connection 45 and the link 44 downwardly, since the link 36 has been blocked against further downward movement while the bell crank 38 is in engagement with the stop screw 43. Accordingly, downward movement of the link 44 against the tension of the spring 53 causes throttling of the gas by the valve 25 to suit the load requirement. Since the air valve 21 is connected with the governor lever 28, the air valve is controlled to maintain the proper air-fuel ratio at all loads.

The foregoing system of governing is very desirable where the gas supply is constant over some period and it is desired to use all the gas before supplementing with Diesel fuel. The Diesel fuel-gas ratio controlling bell crank 49 can, under constant gas supply conditions, be set to use all the gas available and if the load on the engine demands additional fuel the latter will be supplied by the pump 11.

When operating with fuel ratios of 30% Diesel fuel or more, the pilot pump 14 is cut off because it is timed to inject earlier in the compression stroke than the pump 11, since when using Diesel fuel at the rate of 30% or more the cylinder pressures increase above normal. This condition is brought about because Diesel fuel ignites and burns more rapidly than the gaseous fuel. However, when operating with a low percentage of Diesel fuel, gas predominates in the mixture and the slow burning characteristics of this type of fuel require early injection of the pilot fuel in order to maintain good engine efficiency.

To accomplish this change in pilot fuel injection timing, the pilot pump 14 is operatively connected with the fuel quantity control rack 41 of the pump 11 in such a manner that when the delivery of the pump 11 is reduced to about 30% of its full load quantity the pilot pump 14 is brought into action. To this end, a link 60 is pivotally connected with the control rack 41 and with one end of a lever 61 which is pivotally supported at 62. The other end of the lever 61 is arranged to swing into engagement with one end of the control rack 62 of the pilot pump 14, as when the lever 61 is pivoted in a counterclockwise direction through movement of the control rack 41 of the pump 11. A compression spring 63 yieldingly holds the control rack 62 in its cutoff position. As the lever 61 engages the control rack 62, the latter is moved to a metering position against the tension of the spring 63 to cause delivery of Diesel fuel into the pilot nozzle 7.

When the Diesel fuel delivered by the pump 11 is increased either as a result of an increase in the engine load or a change in adjustment of the ratio control bell crank 46, the lever 61 is pivoted in a clockwise direction and the preadjusted point spring 63 forces the control rack 62 into its off position so that no pilot fuel will be delivered by the pilot pump 14.

Figure 2 illustrates a typical timing diagram. As shown therein, the intake valve 18 opens into the combustion chamber 10 from 64 to 65, and the gas valve 24 is timed to open over a shorter period, as from 64 to 66, so that the gas valve 24 is closed during the exhaust valve and the inlet valve 18 overlap period from 67 to 68, the exhaust valve remaining open from 69 to 68. The pump 14 is timed to begin its injection at 70 to maintain the cylinder pressure and produce efficient combustion when operating on gas. The pump 11 is timed to begin its injection at 71 to produce the correct cylinder pressure for mixed fuel or full Diesel operation.

While Figure 1 shows an engine embodying a single cylinder, it is obvious that the invention is equally well adapted for use in a multi-cylinder engine. Under such conditions, each cylinder would be provided with injection pumps, nozzles, and valves in accordance with the single cylinder embodiment of Figure 1, and the air valve 21 and the gas valve 25 would supply the needs of a bank of cylinders.

It will be understood that the invention is not to be limited to the specific construction or arrangement of parts shown, but that they may be widely modified within the invention defined by the claims.

What is claimed is:

1. In an internal combustion engine: the combination of a cylinder having a combustion chamber; air, gas fuel, and Diesel fuel admitting means for said combustion chamber; means for controlling the relative quantities of gas fuel and Diesel fuel to be admitted to the combustion chamber; means for regulating the total quantity of air, gas fuel, and Diesel fuel admitted to the combustion chamber in accordance with engine load demands but maintaining a pilot admission of Diesel fuel regardless of the quantity of admitted gas fuel; and means for changing the admission timing of the pilot Diesel fuel.

2. In an internal combustion engine: the combination of a cylinder having a combustion chamber; air admitting means for said combustion chamber; gas fuel admitting means for said combustion chamber; Diesel fuel admitting means for said combustion chamber; means for controlling the admission of a predetermined quantity of gas fuel to the combustion chamber; and engine driven means for regulating the total quantity of air, gas fuel, and Diesel fuel admitted to said combustion chamber in accordance with engine load demands but maintaining a pilot admission of Diesel fuel regardless of the quantity of gas fuel admitted to the combustion chamber.

3. In an internal combustion engine: the combination of a cylinder having a combustion chamber; air admitting means for said combustion chamber; gas fuel admitting means for said combustion chamber; Diesel fuel admitting means for said combustion chamber; means for controlling the relative quantities of gas fuel and Diesel fuel to be admitted to the combustion chamber; engine driven means for regulating the total quantity of air, gas fuel, Diesel fuel admitted to said combustion chamber in accordance with engine load demands but maintaining a pilot admission of Diesel fuel regardless of the quantity of gas fuel admitted to the combustion chamber; and means for varying the admission timing of the pilot Diesel fuel.

4. In an internal combustion engine: the combination of a cylinder having a combustion chamber; air admitting means for said combustion chamber; gas fuel admitting means for said combustion chamber; Diesel fuel admitting means for said combustion chamber; means for controlling the admission of a predetermined quantity of gas fuel to the combustion chamber; means for regulating the admission of Diesel fuel to the combustion chamber in such amounts as to supplement deficiencies in gas fuel; and means for regulating to total quantity of air, gas fuel, and Diesel fuel to the combustion chamber in accordance with engine load demands.

5. In an internal combustion engine: the combination of a cylinder having a combustion chamber; air admitting means for said combustion chamber; gas fuel admitting means for said combustion chamber; Diesel fuel admitting means for said combustion chamber; means for controlling the admission of a predetermined quantity of gas fuel to the combustion chamber; means for regulating the admission of Diesel fuel to the combustion chamber in such amounts as to supplement deficiencies in gas fuel; means for regulating to total quantity of air, gas fuel, and Diesel fuel to the combustion chamber in accordance with engine load demands but maintaining an injection of pilot Diesel fuel regardless of the quantity of gas fuel admitted to the combustion chamber; and means for varying the injection timing of the pilot Diesel fuel.

6. In an internal combustion engine: the combination of a cylinder having a combustion chamber; means for admitting air to said combustion chamber; gas fuel admitting means for said combustion chamber; Diesel fuel admitting means for said combustion chamber; manually operated means for controlling said gas fuel admitting means and said Diesel fuel admitting means to admit predetermined relative quantities of gas fuel and Diesel fuel to the combustion chamber; and means for increasing the admission of one fuel to supplement deficiencies in the other fuel and for regulating the total amount of air, gas fuel, and Diesel fuel admitted to the combustion chamber in accordance with engine load demands.

7. In an internal combustion engine: the combination of a cylinder having a combustion chamber; means for admitting air to said combustion chamber; gas fuel admitting means for said combustion chamber; Diesel fuel admitting means for said combustion chamber; manually operated means for controlling said gas fuel admitting means and said Diesel fuel admitting means to admit predetermined relative quantities of gas fuel and Diesel fuel to the combustion chamber; means for increasing the admission of one fuel to supplement deficiencies in the other fuel and for regulating the total amount of air, gas fuel, and Diesel fuel admitted to the combustion chamber in accordance with engine load demands; and means for admitting a pilot injection of Diesel fuel to the combustion chamber regardless of the quantity of gas fuel admitted thereto.

8. In an internal combustion engine: the combination of a cylinder having a combustion chamber; means for admitting air to said combustion chamber; gas fuel admitting means for said combustion chamber; Diesel fuel admitting means for said combustion chamber; means for controlling said gas fuel admitting means and said Diesel fuel admitting means to admit predetermined relative quantities of gas fuel and Diesel fuel to the combustion chamber; means for increasing the admission of one fuel to supplement deficiencies in the other fuel and for regulating the total amount of air, gas fuel, and Diesel fuel admitted to the combustion chamber in accordance with engine load demands; means for admitting a pilot injection of Diesel fuel to the combustion chamber regardless of the quantity of gas fuel admitted thereto; and means for varying the injection timing of the pilot Diesel fuel.

9. In an internal combustion engine: the combination of a cylinder having a combustion chamber; air admitting means for said combustion chamber; gas fuel admitting means for the combustion chamber; Diesel fuel admitting means for said combustion chamber; manually operated means for adjusting said gas fuel admitting means and said Diesel fuel admitting means to admit predetermined relative quantities of gas fuel and Diesel fuel to the combustion chamber; an engine driven governor; and operating connections between said governor and the respective air admitting means, the gas fuel admitting means, and said Diesel fuel admitting means for controlling the total quantity of air and Diesel fuel admitted to the combustion chamber in direct proportion to the quantity of gas fuel admitted to the combustion chamber and in accordance with engine load demands.

10. In an internal combustion engine: the combination of a cylinder having a combustion chamber; air admitting means for said combustion chamber; gas fuel admitting means for the combustion chamber; Diesel fuel admitting means for said combustion chamber; means for adjusting said gas fuel admitting means and said Diesel fuel admitting means to admit predetermined relative quantities of gas fuel and Diesel fuel to the combustion chamber; an engine driven governor; operating connections between said governor and the respective air admitting means, the gas fuel admitting means, and said Diesel fuel admitting means for controlling the total quantity of air and Diesel fuel admitted to the combustion chamber in direct proportion to the quantity of gas fuel admitted to the combustion chamber and in accordance with engine load demands but maintaining a pilot injection of Diesel fuel regardless of the quantity of gas fuel admitted to the combustion chamber; and means for automatically advancing the injection timing of the pilot Diesel fuel when operating on all gas fuel or a fuel mixture predominantly gas fuel.

11. The invention claimed in claim 9 wherein two of said operating connections include a common floating lever operatively connected with said governor.

12. In an internal combustion engine: the combination of a cylinder having a combustion chamber; air admitting means for said combustion chamber; gas fuel admitting means for the combustion chamber; Diesel fuel admitting means for said combustion chamber; means for adjusting said gas fuel admitting means and said Diesel fuel admitting means to admit predetermined relative quantities of gas fuel and Diesel fuel to the combustion chamber; an engine driven governor; operating connections between said governor and the respective air admitting means, the gas fuel admitting means, and said Diesel fuel admitting means for controlling the total quantity of air, gas fuel, and Diesel fuel admitted to the combustion chamber in accordance with engine load demands; and means operatively connected with said Diesel fuel admitting means for injecting a pilot quantity of Diesel fuel into the combustion chamber when operating the engine on all gas fuel or a fuel mixture predominantly gas fuel.

13. In an internal combustion engine: the combination of a cylinder having a combustion chamber; an air admitting control valve for the combustion chamber; a gas fuel admitting control valve for the combustion chamber; an injection nozzle communicating with said combustion chamber; a Diesel fuel pump connected with said nozzle and having a control rack; an engine driven governor operatively connected with said air admitting control valve; a floating lever operatively connected with said governor; an operating connection between said floating lever and said gas fuel admitting control valve; an operating connection between said floating lever and said control rack; and manually controlled means for adjusting said floating lever to set said gas fuel admitting control valve and said control rack to admit predetermined relative quantities of gas fuel and Diesel fuel to said combustion chamber.

14. The invention claimed in claim 13 wherein said manually controlled means include a gas fuel scale and a Diesel fuel scale reading in reverse directions with respect to each other; a pivotally supported bell crank having an indicator fixed thereto and coacting with said scales; and means for adjusting said bell crank.

15. In an internal combustion engine: the combination of a cylinder having a combustion chamber; an air admitting control valve for the combustion chamber; a gas fuel admitting control valve for the combustion chamber; an injection nozzle communicating with said combustion chamber; a Diesel fuel pump connected with said nozzle and having a control rack; an engine driven governor operatively connected with said air admitting control valve; a floating lever operatively connected with said governor; an operating connection between said floating lever and said gas fuel admitting control valve; an operating connection between said floating lever and said control rack; manually controlled means for adjusting said floating lever to set said gas fuel admitting control valve and said control rack to admit predetermined relative quantities of gas fuel and Diesel fuel to said combustion chamber; a pilot injection nozzle communicating with said combustion chamber; a Diesel fuel pilot pump connected with said pilot injection nozzle and having a control rack; and an operating connection between the control rack of said Diesel fuel pump and the control rack of said Diesel fuel pilot pump to cause a pilot injection of Diesel fuel when the engine is operating on all gas fuel or a fuel mixture predominantly gas fuel.

16. In an internal combustion engine: the combination of cylinder means provided with combustion chamber means; air admitting means for said combustion chamber means; gas fuel admitting means for said combustion chamber means; Diesel fuel admitting means for said combustion chamber means; means for adjusting said gas fuel admitting means and said Diesel fuel admitting means to admit predetermined relative quantities of gas fuel and Diesel fuel; and means for automatically controlling said air admitting means, said gas fuel admitting means, and said Diesel fuel admitting means for admitting air, gas fuel, and Diesel fuel in accordance with engine load demands.

17. The invention claimed in claim 13 wherein said air admitting control valve is provided with a conduit leading to the combustion chamber; a conduit leading from said gas fuel control valve to said combustion chamber; and valves for controlling communication between the respective conduits and the combustion chambers.

RALPH MILLER.
RICHARD L. JANSEN.